United States Patent [19]

Miyazaki et al.

[11] Patent Number: 4,764,869
[45] Date of Patent: Aug. 16, 1988

[54] METHOD AND APPARATUS FOR CONTROLLING INTERRUPTION IN THE COURSE OF INSTRUCTION EXECUTION IN A PROCESSOR

[75] Inventors: Yoshihiro Miyazaki; Soichi Takaya; Masayuki Tanji, all of Hitachi; Atsuhiko Nishikawa, Mito; Shinichiro Yamaguchi, Hitachi, all of Japan

[73] Assignee: Hitachi, Ltd., Tokyo, Japan

[21] Appl. No.: 900,987

[22] Filed: Aug. 27, 1986

[30] Foreign Application Priority Data
Aug. 30, 1985 [JP] Japan .................................. 60-189637

[51] Int. Cl.$^4$ .............................................. G06F 9/46
[52] U.S. Cl. .................................................... 364/300
[58] Field of Search ... 364/200 MS File, 900 MS File, 364/300

[56] References Cited

U.S. PATENT DOCUMENTS
4,429,360  1/1984  Hoffman et al. .................... 364/200

OTHER PUBLICATIONS

VaxII-Architecture Handbook, pp. 52–55, 234, 235.

Primary Examiner—Raulfe B. Zache
Attorney, Agent, or Firm—Antonelli, Terry & Wands

[57] ABSTRACT

Method and apparatus for controlling interruption of a processor. When an external interrupt request having a higher priority level than a current program level is detected in the course of the execution of an instruction, the processing is interrupted and an interexecution interruption is issued. The program level is fixed in this interruption so that the interrupt request is processed as a normal interrupt request at an interruption destination, and the processing is resumed from the interrupted point at a second return instruction after the interrupt processing.

10 Claims, 16 Drawing Sheets

FIG. IA
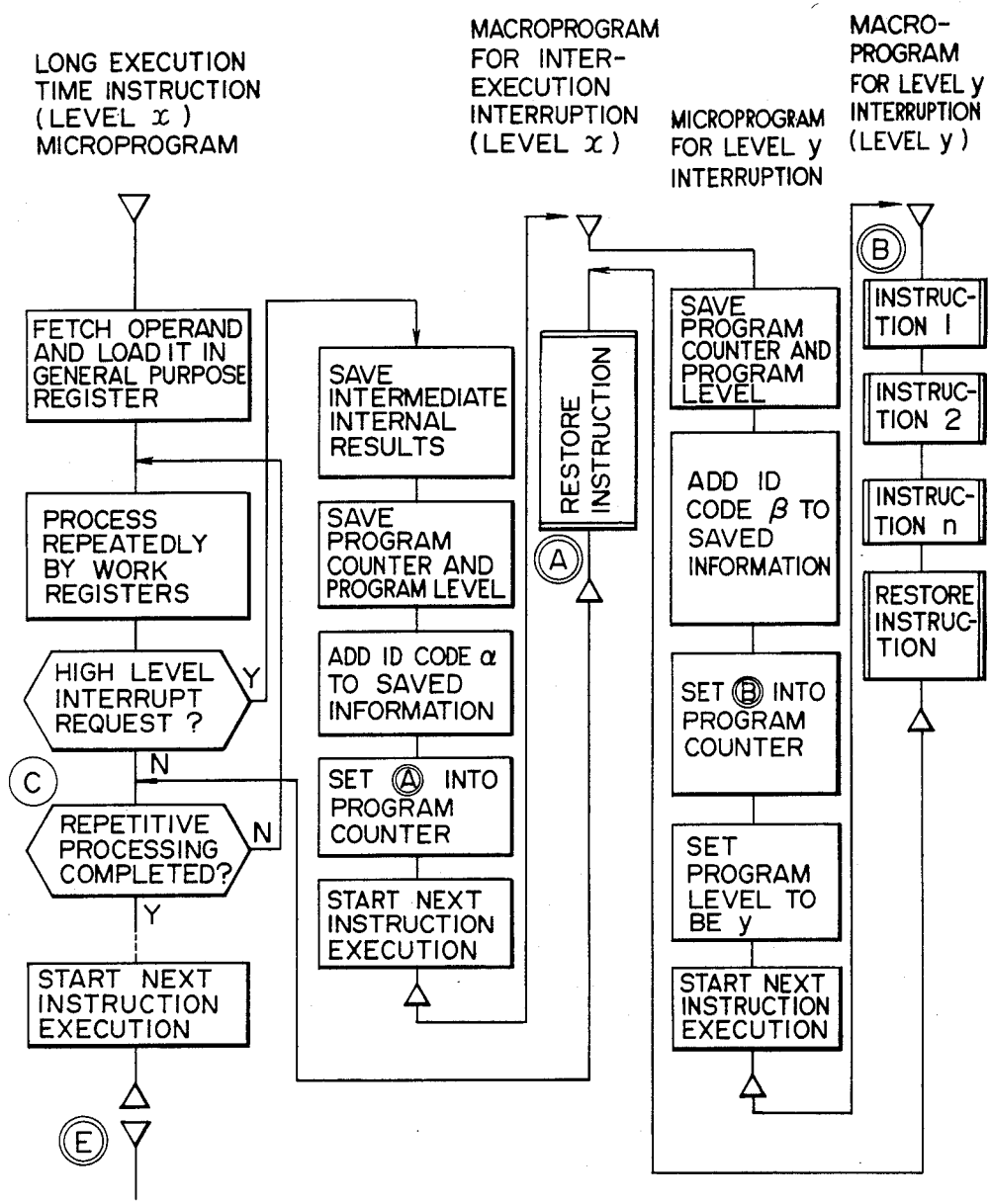

FIG. 2B
PRIOR ART

RESTORE INSTRUCTION
MICROPROGRAM

▽

```
┌─────────────────────┐
│ RESTORE PROGRAM     │
│ COUNTER  AND        │
│ PROGRAM LEVEL       │
└─────────────────────┘
          │
┌─────────────────────┐
│ START NEXT          │
│ INSTRUCTION EXECUTION│
└─────────────────────┘
```

RESTORE INSTRUCTION
MICROPROGRAM

▽

```
┌─────────────────────┐
│ RESTORE PROGRAM     │
│ COUNTER, PROGRAM    │
│ LEVEL AND FPD       │
│ FLAG                │
└─────────────────────┘
          │
┌─────────────────────┐
│ START NEXT          │
│ INSTRUCTION EXECUTION│
└─────────────────────┘
```

MAIN
MEMORY
ADDRESS

| | |
|---|---|
| 0 | LEVEL 0 INTERRUPTION VECTOR (2000)₁₆ |
| 4 | LEVEL 1 INTERRUPTION VECTOR (2080)₁₆ |
| 8 | LEVEL 2 INTERRUPTION VECTOR (2100)₁₆ |
| 12 | LEVEL 3 INTERRUPTION VECTOR (2180)₁₆ |
| 16 | LEVEL 4 INTERRUPTION VECTOR (2200)₁₆ |
| 20 | LEVEL 5 INTERRUPTION VECTOR (2280)₁₆ |
| 24 | LEVEL 6 INTERRUPTION VECTOR (2300)₁₆ |
| 28 | LEVEL 7 INTERRUPTION VECTOR (2380)₁₆ |
| 32 | INTEREXECUTION INTERRUPTION VECTOR (2400)₁₆ |
| 36 | |

FIG. 10

| | |
|---|---|
| GR 7 → (FFE8)₁₆ | |
| (FFEC)₁₆ | PLVL (0) |
| (FFF0)₁₆ | PC (NEXT MACROINSTRUCTION START ADDRESS) |
| (FFF4)₁₆ | IDCODE (8) |
| (FFF8)₁₆ | WK 1 |
| (FFFC)₁₆ | WK 2 |
| | WK 7 (1003) |

INTEREXECUTION INTERRUPTION STACK SAVED INFORMATION

FIG. 14
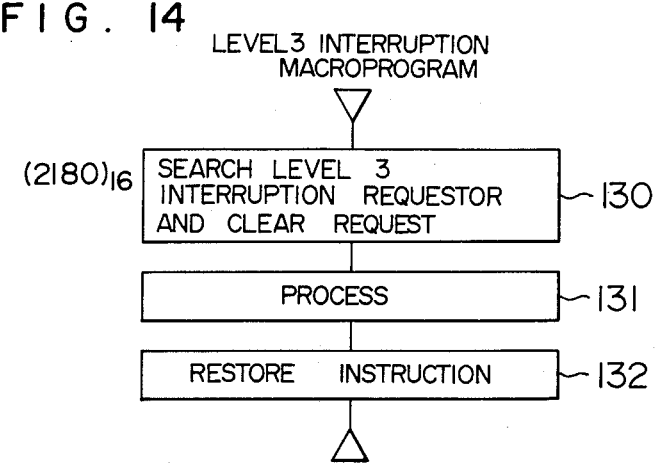
FIG. 15 RESTORE INSTRUCTION MICROPROGRAM
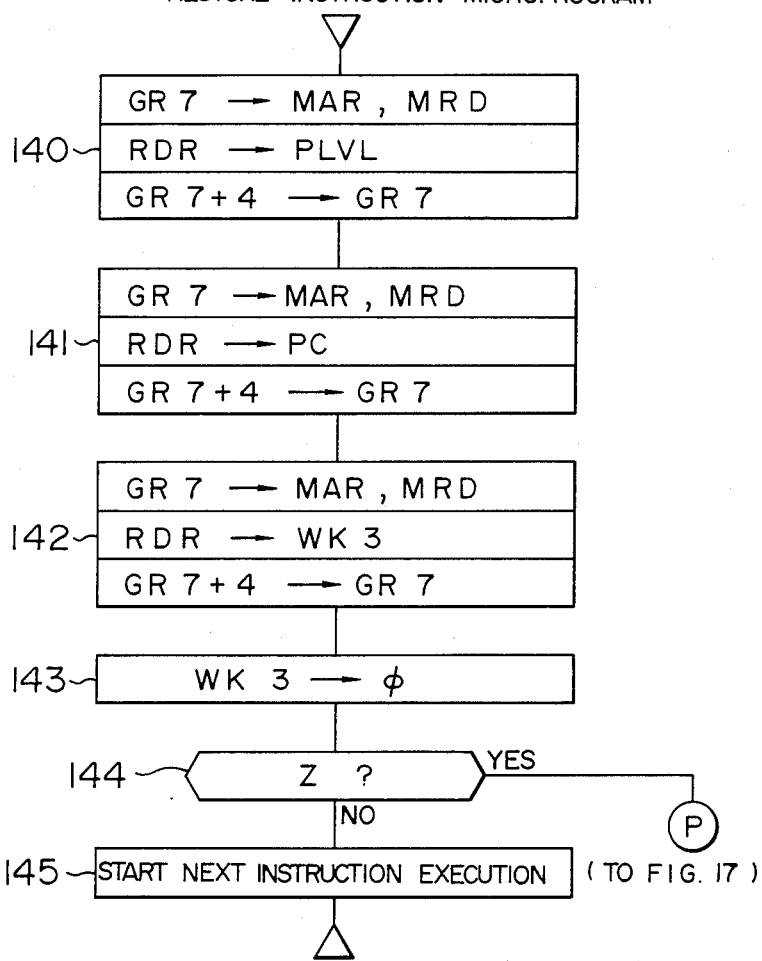

METHOD AND APPARATUS FOR CONTROLLING INTERRUPTION IN THE COURSE OF INSTRUCTION EXECUTION IN A PROCESSOR

BACKGROUND OF THE INVENTION

The present invention relates to a method and an apparatus for controlling interruption of a processor, and more particularly to interruption in the course of instruction execution.

In order to speed up character processing or list processing, processing may be implemented by firmware. However, because an execution time for each instruction is very long, a response to an external input will be lowered unless an interruption is permitted in the course of instruction execution. Such interruption in the course of instruction execution is shown in VAX 11 Architecture Handbook and U.S. Pat. No. 3,401,375.

Pertinent portions of the prior art are briefly explained. As shown in FIGS. 2A and 2B, in a conventional interruption, when an interruption is requested, a program counter and a program level are switched at a break of an instruction, and the program counter and program level are restored after interruption processing. On the other hand, in a processor status longword described in the VAX 11 Architecture Handbook, pages 52 and 53, a first part done (FPD) flag is provided to carry out control as shown in FIGS. 3A and 3B to permit the interruption in the course of instruction execution.

In the method shown in FIGS. 3A and 3B, if repetitive processing is to be carried out by a work register, a content of the register at an interruption destination will be destroyed. Accordingly, the repetitive processing must be performed by a general purpose register. Thus, a plurality of general purpose registers are required for one instruction. Because the general purpose registers are used for other purpose, it is necessary to save contents of the registers which may be destroyed, prior to the execution of the instruction which includes the repetitive processing, and to restore those registeres after the completion of the instruction execution. This is wasteful processing. Further, the process must return to an address (D) in FIG. 3A by a restore instruction, and decision as to whether the FPD flag is "1" or not must be made.

An execution time of such an instruction is not always long but an execution time may be short for searching or pattern matching. Accordingly, a proportion occupied by saving and restoring is large. For example, where this instruction is used to transfer 16 bytes of data and 4 bytes of data are read or written by each memory access, four times of register saving access, eight times of memory access and four times of register restoring access are required. Thus, 50% of total access time is spent for the register saving and restoring accesses.

SUMMARY OF THE INVENTION

It is an object of the present invention to attain interruption in the course of instruction execution while eliminating disadvantages of the prior art method.

In the interrupt processing, an execution of one program is interrupted by hardware means to allow execution of another program while permitting resumption of the execution of the interrupted program. In the present invention, such processing includes at least saving a program counter and a program level, setting a start address of a macroprogram into the program counter, setting an interrupt level into the program level, and restoring the program counter and the program level in response to a restore instruction.

In accordance with the present invention, when a request having a higher priority than a current program level is detected in the course of the instruction execution, the processing is interrupted and an interruption request in the course of instruction execution is issued, and the program level is not changed during the interruption so that the interrupt request is processed as a normal interruption at the interruption destination, and the processing is resumed in the course of the instruction execution by a second restore instruction after the interruption processing.

BRIEF DESCRIPTION OF THE DRAWINGS

FIGS. 1A and 1B show a control method of the present invention,

FIGS. 2A and 2B show a conventional control method,

FIGS. 3A and 3B show a known control method,

FIG. 10 shows a format of stack saved information for the interruption in the course of instruction execution, FIG. 11 shows an interrupt vector table, FIG. 14 shows a macroprogram for the level 3 interruption, FIG. 15 shows a microprogram of a restore instruction.

DESCRIPTION OF THE PREFERRED EMBODIMENTS

Figure 1B:
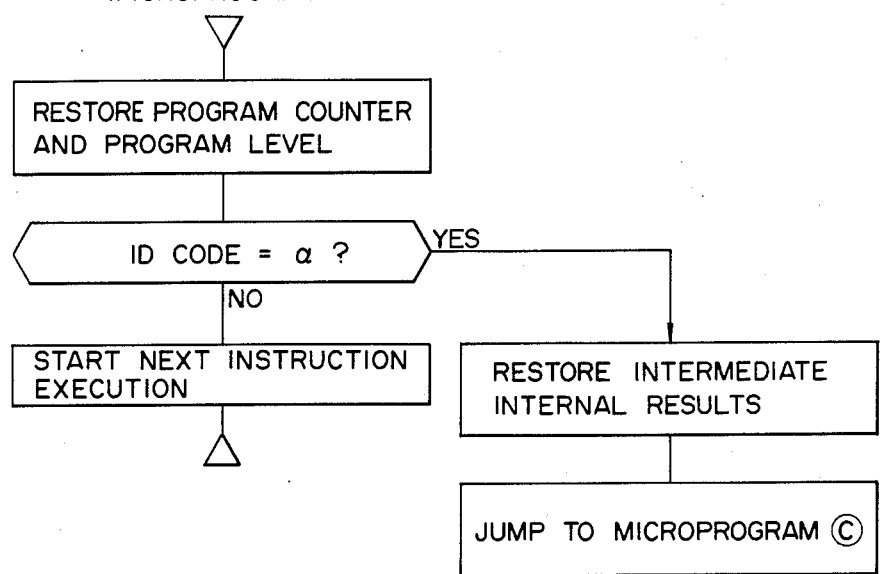
Figure 2A:
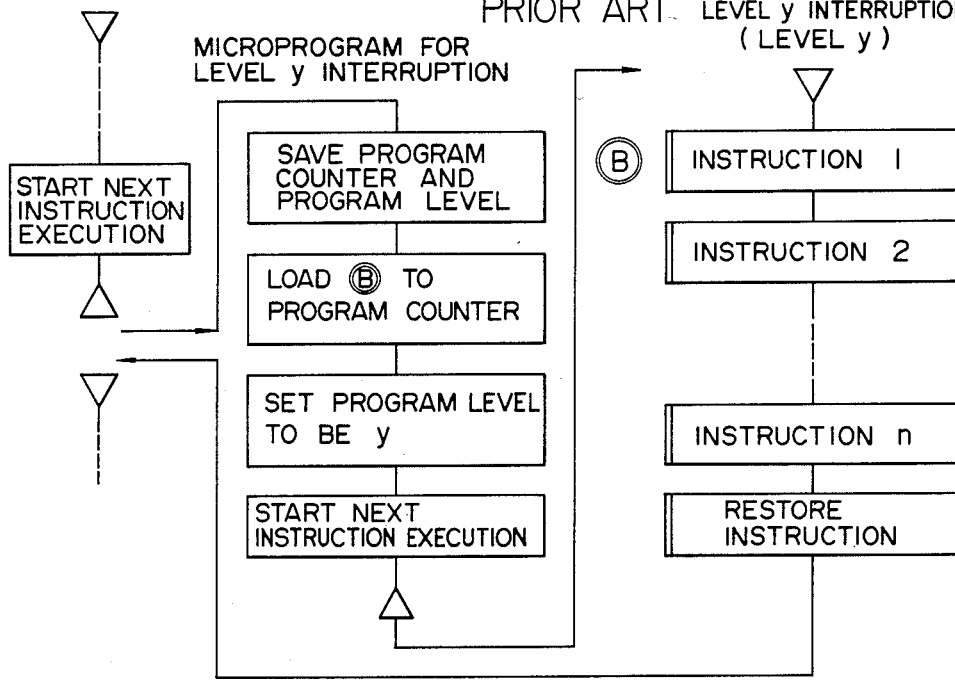
Figure 3A:
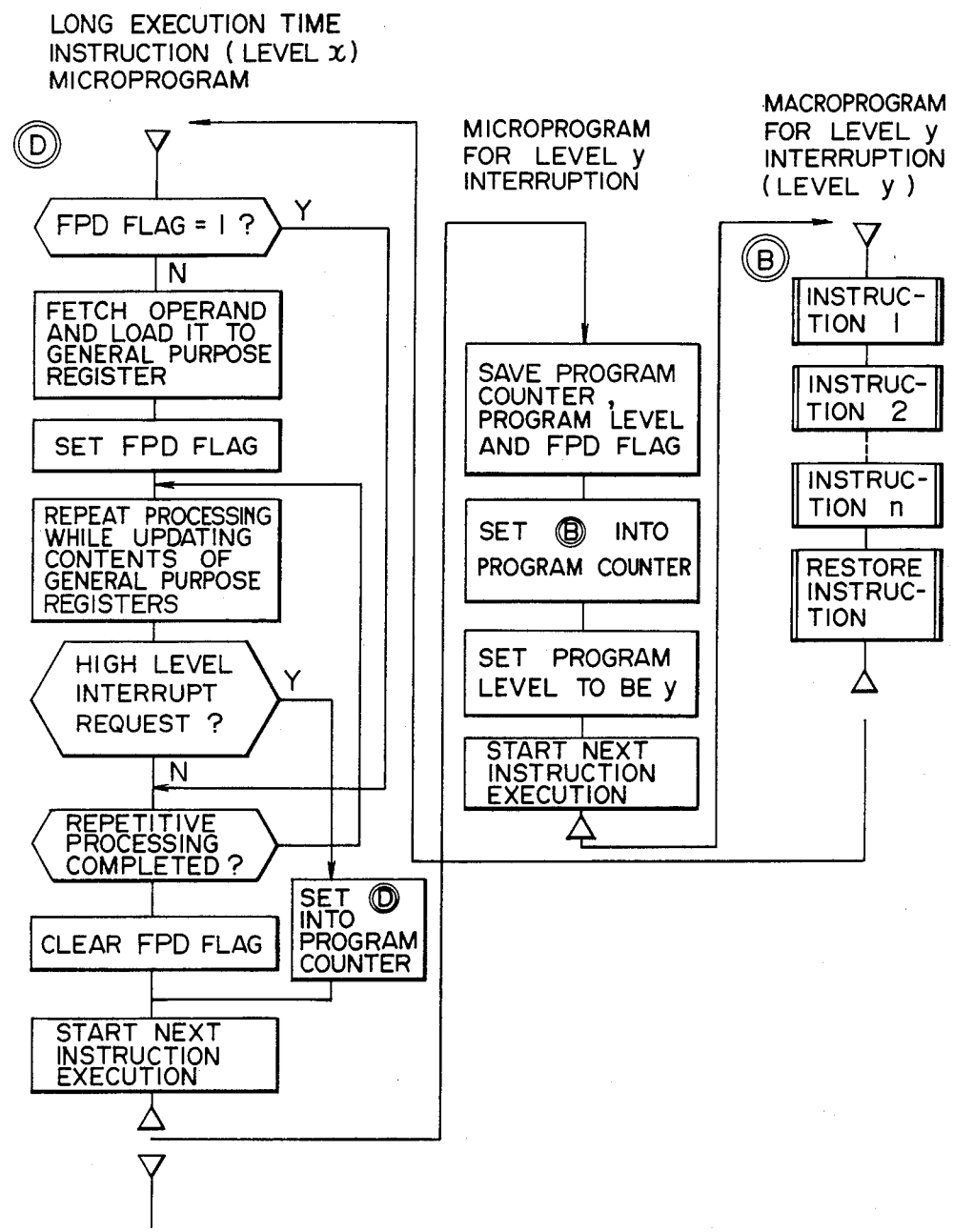

FIGS. 1A and 1B show a control method of the present invention. In the figures, [▯▭▭▭▭▭] indicates a macroinstruction processing and [▭▭▭▭▭] indicates a microinstruction processing. The macroinstruction refers to an instruction in a main storage, and the microinstruction refers to an instruction in a control store (44 in FIG. 6).

Figure 4:
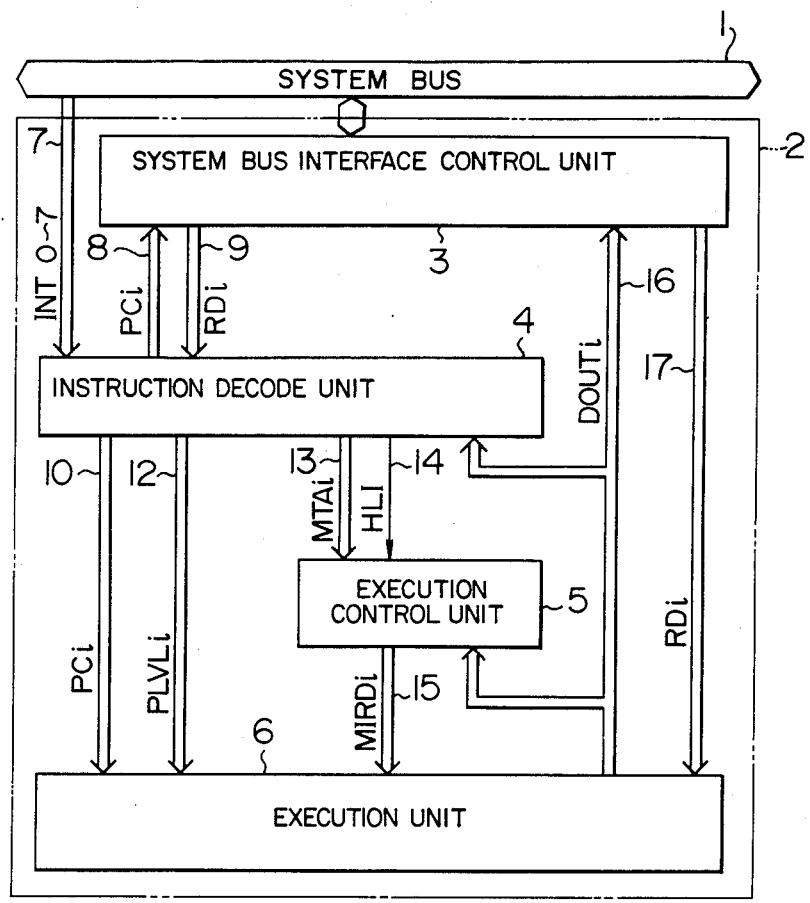
FIG. 4 shows a basic processing architecture.

FIG. 4 shows a configuration of a basic processing unit or a central processing unit 2. A system bus interface control unit 3 controls data transfer to and from a main storage and I/O devices through a system bus 1. An instruction decode unit 4 decodes a macroinstruction to generate a start address 13 of a microprogram. An execution control unit 5 controls a microinstruction. An execution unit 6 executes operations under the control of the microinstruction.

Figure 5:
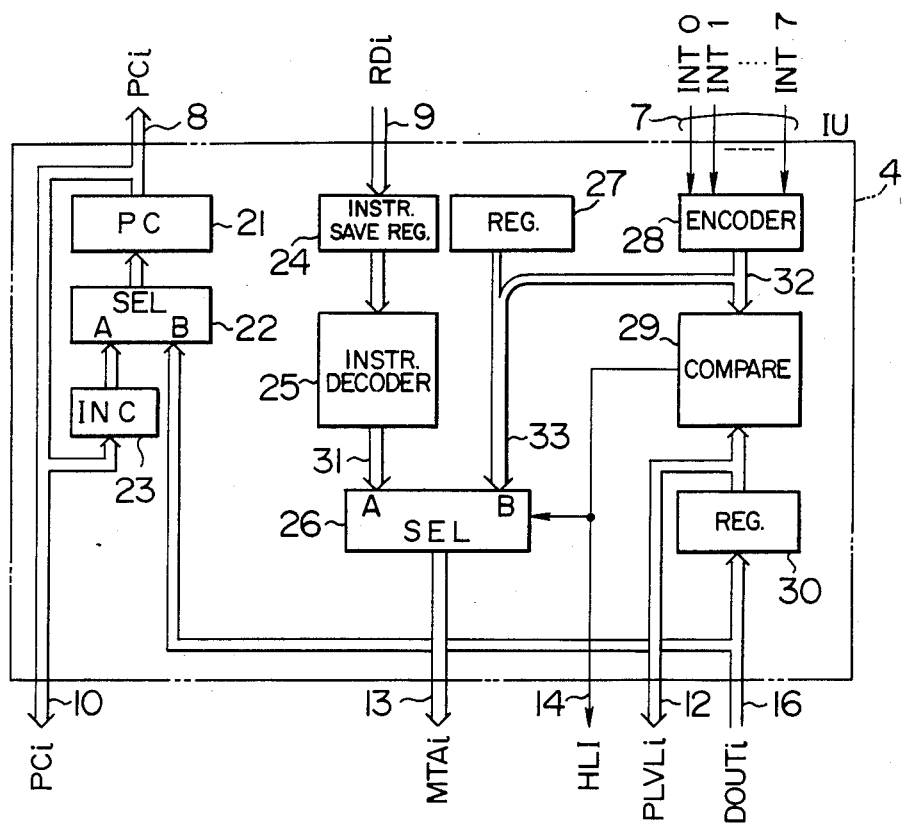
FIG. 5 shows an instruction decode unit.

FIG. 5 shows a configuration of the instruction decode unit 4. A program counter (PC) 21 points an address on the main storage of the macroinstruction to be decoded. A selector 22 selects the next PC. It selects an input B supplied from the execution unit 6 when a branch is to be made, and selects an output of an incrementer 23 when the branch is not to be made. The macroinstruction read out is loaded to an instruction save register 24, and an output therefrom is decoded by an instruction decoder 25 so that a start address 31 of a microprogram corresponding to the macroinstruction is generated. On the other hand, an interrupt request signal 7 from the system bus 1 has a highest interrupt level imparted by an encoder 28. A result 32 thereof and a fixed pattern register 27 are combined so that a start address 33 of the microprogram for the interrupt processing is generated. The interrupt level 32 and the program level in register 30 are compared by a comparator 29. An output 14 thereof is ON if the interrupt level is higher than the program level and the interrupt request is to be accepted, and OFF otherwise. When the prioritized interrupt signal 14 is ON, the selector 26 selects the interruption start address 33, and when the signal 14 is OFF, it selects the macroinstruction start address 31, which is used as the microprogram start address 13 for the next processing. In order to generate the microprogram start address 13 in this manner, it is necessary that the program level is fixed in the interruption. This mechanism is used to interrupt at a break of the macroinstruction. The prioritized interrupt signal 14 is supplied to the execution control unit 5 and used to interrupt in the course of instruction execution, which is a characteristic of the present invention.

Figure 6:
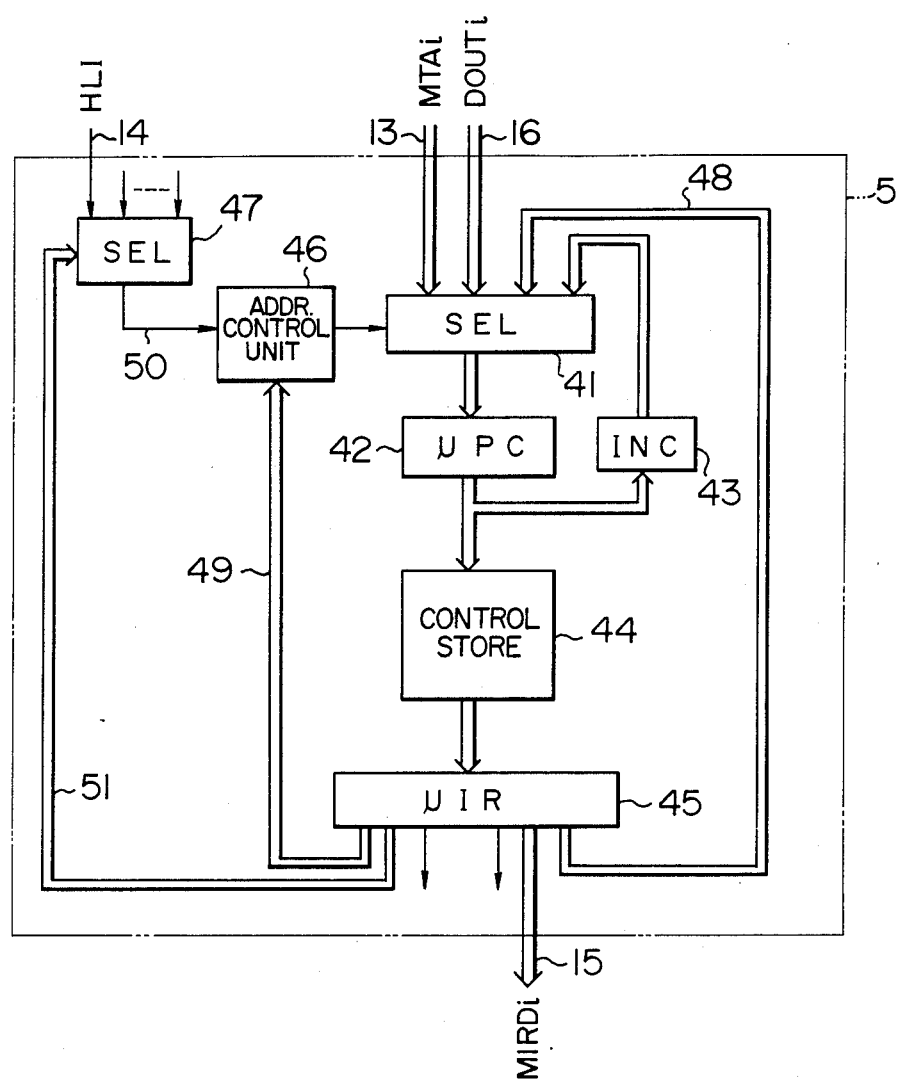
FIG. 6 shows an execution control unit.

FIG. 6 shows a configuration of the execution control unit 5. The microprogram is stored in a control store 44. A microprogram counter (MPC) 42 points an address on the control store 44 of the microinstruction to be next executed. A selector 41 selects the next MPC. It selects the start address 13 supplied from the instruction decode unit 4 when the process is to be proceeded to the next processing, selects the output data 16 of the execution unit 6 when a branch is to be made in accordance with an execution result, selects a portion 48 of the microinstruction when the branch microinstruction is to be executed, and selects the output of the incrementer 43 when the microinstruction at the next address is to be executed. A next address control unit 46 controls the selector 41 in accordance with a portion 49 of the microinstruction and a condition signal 50. A selector 47 determines the condition and controls the selection of the signal by a portion 51 of the microinstruction. The prioritized interrupt signal 14 is applied to one of the inputs to the selector 14, and the microinstruction can determine the ON/OFF state of this signal.

Figure 7:
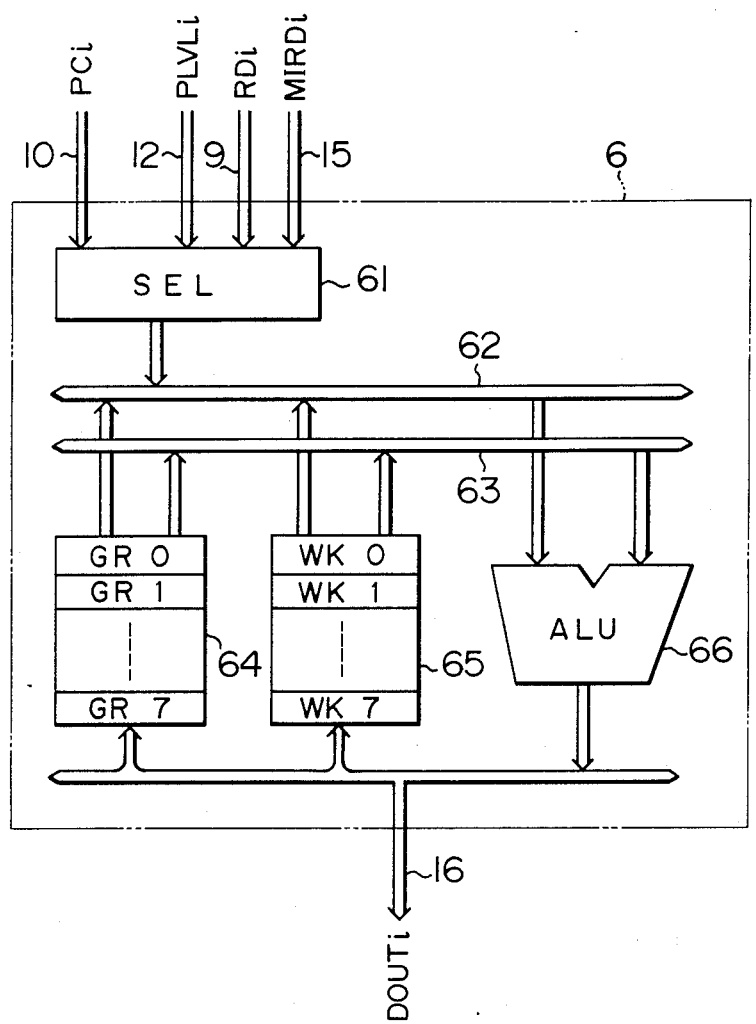
FIG. 7 shows an execution unit.

FIG. 7 shows a configuration of the execution unit 6. A selector 61 selects one of the program counter 10, program level 12, system bus read data 9 and a portion 15 of the microinstruction and sends it to an input bus 62. Outputs of macroinstruction general purpose registers (GR0-GR7) 64 or microinstruction work registers (WK0-WK7) 65 are supplied to an input bus 62 or an input bus 63. An ALU 66 receives the input buses 62 and 63 and supplies an operation result to an output bus 16, which is connected to the general purpose registers (GR0-GR7) 64 and the work registers (WK0-WK7) 65 as well as other units.

Figure 8:
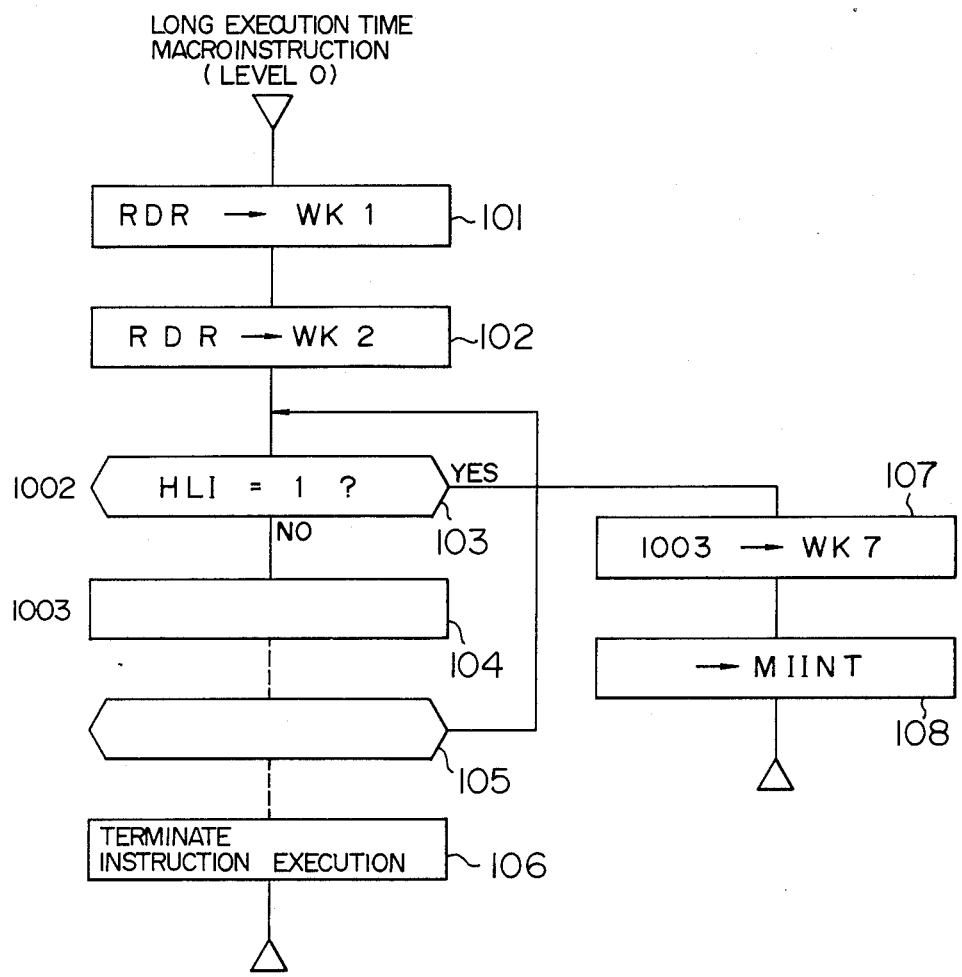
FIG. 8 shows a long execution time macroinstruction microprogram.

FIG. 8 shows a flow chart of a microprogram for a long execution time macroinstruction (character processing or list processing). In steps 101 and 102, operands are loaded to work registers WK1 and WK2. The microprogram uses WK1 and WK2 as pointers and repeatedly execute steps 103 to 105 while updating WK1 and WK2, and goes to a step 106 on a condition to terminate the instruction execution. In the step 103, whether the prioritized interrupt signal 14 is ON or not is checked, and if it is ON, that is, if an interrupt request having a higher priority than the current program level has been issued in the course of the instruction execution, the process proceeds to a step 107. In the step 107, the address 1003 of the step 104©in FIG. 1A) is set in WK7. In actual, the constant field 15 (see FIG. 4) of the microinstruction in the step 107 is set to a pattern of 1003, and it is set into WK7 through the selector 61 and ALU 66 (see FIG. 7). In a step 108, the process branches to an interexecution interruption microprogram MIINT.

Figure 9:
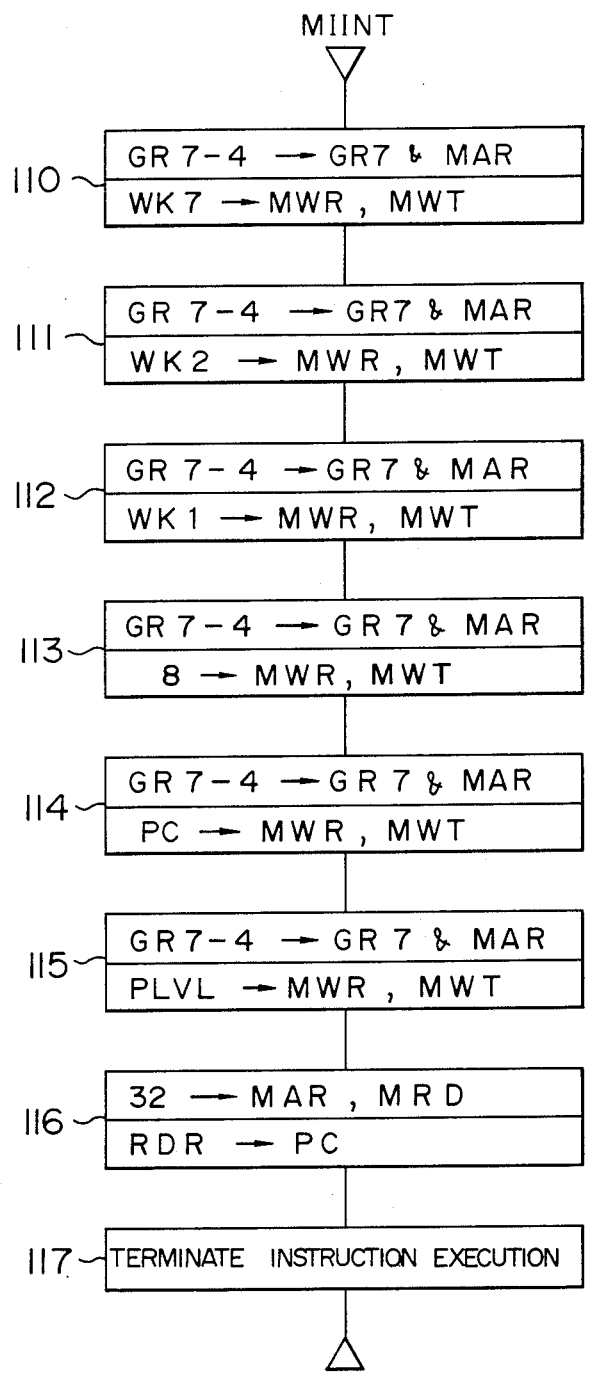
FIG. 9 shows a microprogram for interruption in the course of instruction execution.

FIG. 9 shows a flow chart of the interexecution interruption microprogram. In a step 110, the general purpose register GR7 (which is used as a stack pointer) is reduced by 4 and the difference is loaded to GR7 and a memory address register (MAR) (which is a register of the system bus interface control unit 3 and can be loaded from the execution unit 6 through the output bus 16 of FIG. 4). The content of WK7 is loaded to a memory write data register (MWR) (which is a register of the system bus interface control unit 3 and can be loaded from the execution unit 6 through the output bus 16). It also starts the memory write (MWT). As it is started, the content of the MWR is written into the main memory address pointed by the MAR. Thus, WK7 is pushed into the stack. Similarly, in a step 111, WK2 is pushed into the stack, and in a step 112, WK1 is pushed into the stack. In the steps 110–112, intermediate internal results are saved. In a step 113, an ID code "8" (α in FIG. 1A) is pushed into the stack. (The pattern "8" is generated by the constant field 15 of the microinstruction.) In a step 114, PC ( Ⓑ in FIG. 1A) which is the next macroinstruction start address is pushed into the stack, and in a step 115, the program level is pushed into the stack. (PC and the program level are transferred to the execution unit 6 through the interfaces 10 and 12, respectively.) At this moment, saved information as shown in FIG. 10 has been formed in the stack. In a step 116, the data fetched from the address 32 of the main memory is loaded to PC ( Ⓐ in FIG. 1A). The first several tens addresses of the main memory are used for the interrupt vector table, as shown in FIG. 11, and the address 32 stores a start address $(2400)_{16}$ of the macroprogram corresponding to the interexecution interruption. In a step 117, the instruction execution is terminated and the execution of the next instruction is initiated.

After the above processing, the process branches to the next microprogram in accordance with the microprogram start address 13 generated by the instruction decode unit 4. Since the prioritized interrupt signal 14 is now on, the start address of the microprogram corresponding to the prioritized interruption is generated by the instruction decode unit 4.

Figure 13:
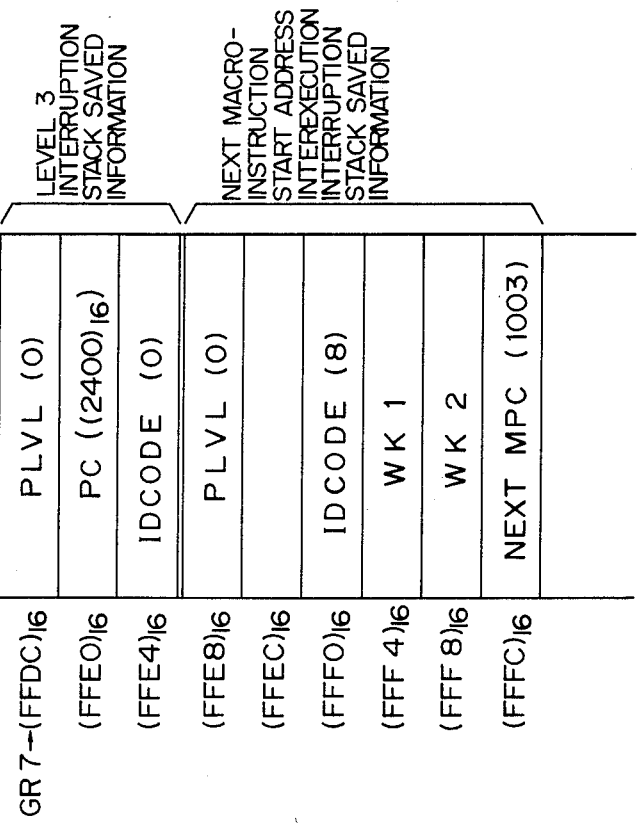
FIG. 13 shows a format of stack saved information for the level 3 interruption.
Figure 12:
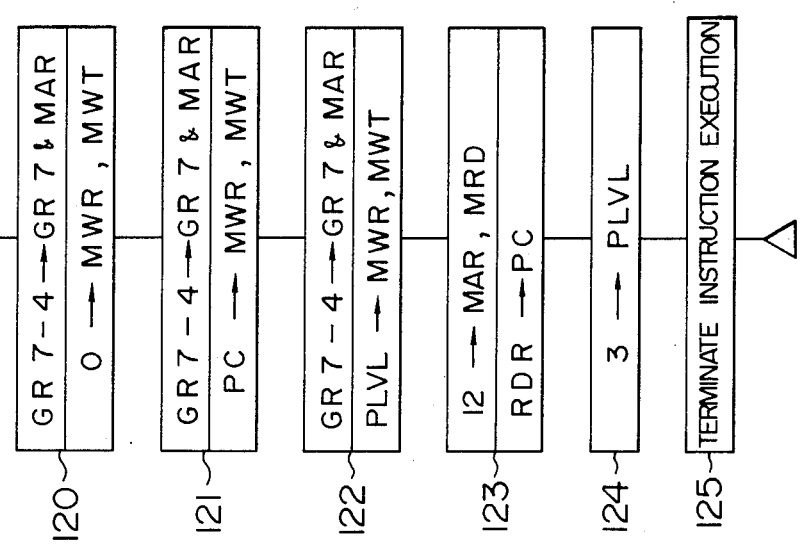
FIG. 12 shows a microprogram for level 3 interruption.

FIG. 12 shows a flow chart of the microprogram for the prioritized interruption. As an example, a microprogram for level 3 interruption is shown. In a step 120, an ID code "0" (β in FIG. 1A) is pushed into the stack. In a step 121, PC ( Ⓐ in FIG. 1A) is pushed into the stack. In a step 122, the program level is pushed into the stack. At this moment, the stack contains information as shown in FIG. 13. In a step 123, the data (Ⓑ in FIG. 1A) read from the address 12 (see FIG. 11) of the main memory is set into the PC. In a step 124, the number "3" (y in FIG. 1A) which is equal to the interrupt level is set as the program level. In a step 125, the instruction execution is terminated and the execution of the next instruction is initiated.

After the above processing, the microprogram start address 13 generated by the instruction decode unit 4 is the address generated by the decoding of the macroinstruction read in accordance with the PC (start address of the microprogram in the macroprogram starting at B ) because the program level was raised to "3" and the prioritized interrupt signal 14 is OFF. The value set in the PC is $(2180)_{16}$ as shown in FIG. 11.

FIG. 14 shows a macroprogram for the level 3 interruption starting at the address $(2180)_{16}$. In the last step 132 of the program, the restore instruction is executed.

FIG. 15 shows a microprogram of a restore instruction. In a step 140, the value popped from the stack (program level=0 prior to the interruption) is set as the program level. In a step 141, the value popped from the stack (program counter=$(2400)_{16}$ ( Ⓐ in FIG. 1A) prior to the interruption) is set into the program counter. In a step 142, the value popped from the stack (ID code=0 ($\beta$ in FIG. 1A)) is set into WK3. In a step 143, the content of WK3 is checked. In a step 144, if the check result is "0" or not is determined. Since WK3 is now "0", the condition is met and the process proceeds to a step 145 to terminate the execution of the instruction. As a result, the process branches to a macroprogram for the interexecution interruption at the address $(2400)_{16}$ ( Ⓐ in FIG. 1A).

Figure 16:
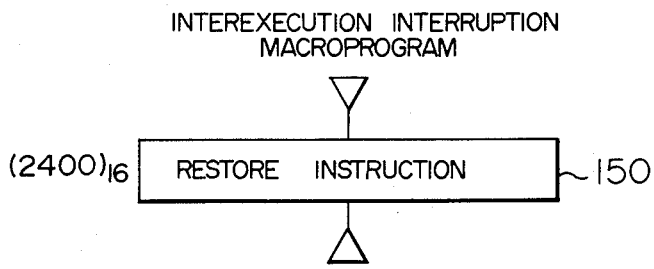
FIG. 16 shows a macroprogram for the interruption in the course of instruction execution.

FIG. 16 shows a microprogram for the interexecution interruption starting at the address $(2400)_{16}$. In this program, only the restore instruction is executed.

Figure 17:
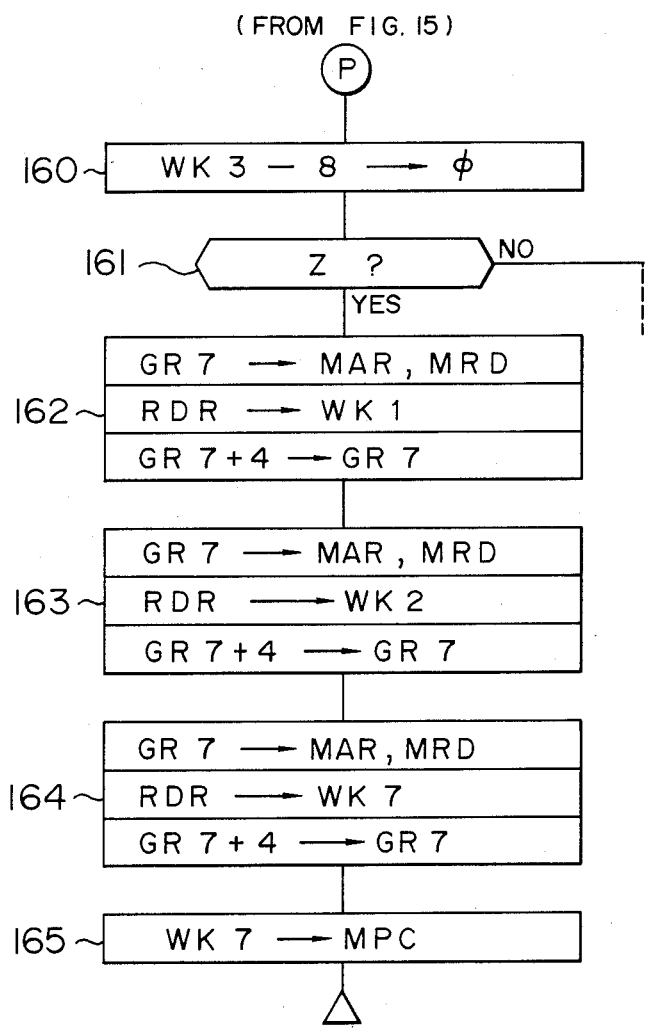
FIG. 17 shows a microprogram (for the interruption in the course of instruction execution) of the restore instruction.

FIG. 17 shows a microprogram of the restore instruction. First half is shown in FIG. 15, and FIG. 17 shows only the portion relating to the restore from the interexecution interruption. In a step 140 of FIG. 15, the value popped from the stack (program level=0 prior to the interruption) is set as the program level. In a step 141, the value popped from the stack (next macroinstruction start address ( Ⓔ in FIG. 1A)) is set into the PC. In a step 142, the value popped from the stack (ID code=8 ($\alpha$ in FIG. 1A)) is set into WK3. In a step 143, the content of WK 3 is checked. In a step 144, if the check result is "0" or not is determined. Since WK3 is now "8", the condition is not met and the process proceeds to a step 160 in FIG. 17. In the step 160, the values of (WK3)−8 is checked. In a step 161, if the check result is "0" or not is determined. Since WK3 is now "8", the condition is met and the process proceeds to a step 162. In the step 162, the value popped from the stack (content of WK1 at the interruption) is set into WK1. In a step 163, the value popped from the stack (content of WK2 at the interruption) is set into WK2. In a step 164, the value popped from the stack (MPC=1003 (Ⓒ in FIG. 1A) for resumption) is set into WK7. In a step 165, the content of WK7 is set into the MPC. This is done by selecting the output bus 16 by the selector 41. As a result, the intermediate results WK1 and WK2 are restored and the interrupted microinstruction is resumed.

Figure 18A:
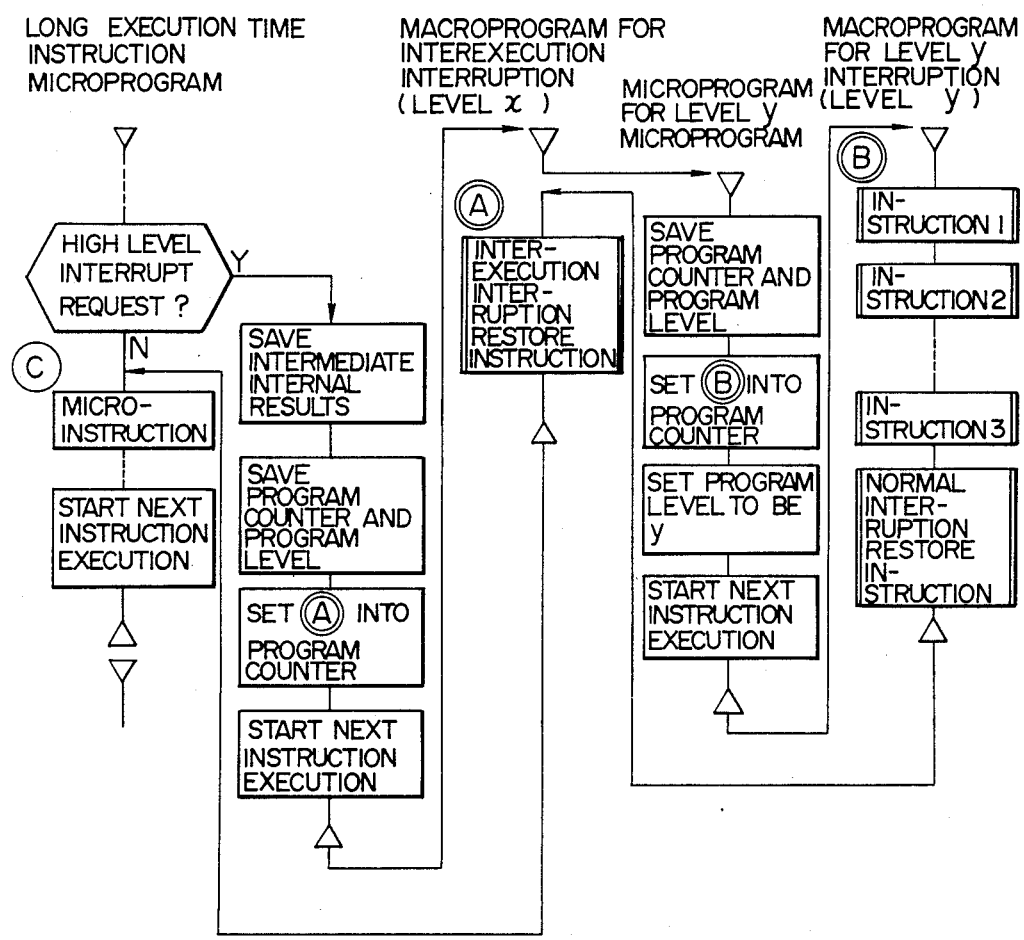
FIGS. 18A, 18B and 18C show control methods in modifications of the present invention.
Figure 18B:
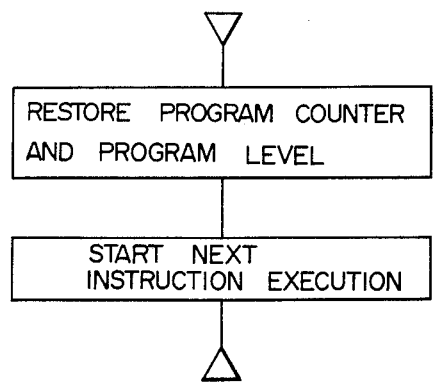
Figure 18C:
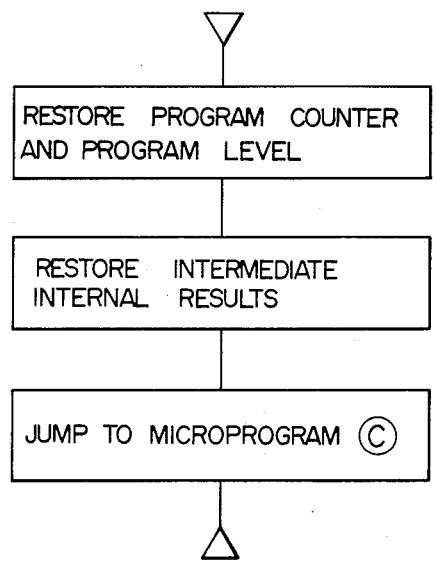

FIGS. 18A, 18B and 18C show modifications of the present invention. The restore instruction discriminates the interexecution interruption not by the ID code in the saved information but by the operation code. It is characterized by the provision of interexecution restore instruction in addition to the normal restore instruction.

In accordance with the present invention, wasteful saving and restoring of the register are eliminated without destroying the general purpose register by the intermediate result. For example, in the transfer of 16 bytes of data, four times of register saving access, eight times of memory access and four times of register restoring access, that is, total of sixteen times of access are required in the prior art method. In the present method, only eight times of memory access are required and the processing speed is increased.

We claim:

1. A method for controlling interruption of a processor for processing interruption in accordance with an interrupt level, comprising the steps of:
   (a) determining an interrupt level in a course of execution of a predetermined instruction;
   (b) saving internal information of said processor;
   (c) setting an address for restore processing for the saving into a program counter as an instruction to be next executed and terminating execution of said predetermined instruction;
   (d) not carrying out the restore processing but carrying out interrupt processing in response to termination of execution of said predetermined instruction; and
   (e) returning to an interrupted point of said predetermined instruction by the restore processing executed from an address set in said program counter after termination of interrupt processing and resuming processing from a return point.

2. A method for controlling interruption of a processor according to claim 1, wherein said restore processing includes a second restore instruction, wherein interrupt processing comprises the step of returning to restore processing by executing a first restore instruction, and wherein restore processing comprises the step of restoring internal information to return to an interrupted point of said predetermined instruction by executing a second restore instruction.

3. A method for controlling interruption of a processor according to claim 2, wherein said internal information contains an address of an instruction to be executed next to the predetermined instruction, a microinstruction address, and a content of work registers.

4. A method for controlling interruption of a processor according to claim 2, wherein said internal information contains, as an identification code, a first identification code indicating a course of executing of a predetermined instruction.

5. A method for controlling interruption of a processor according to claim 4, wherein a first restore instruction and a second restore instruction are identical where the restore instruction checks said identification code, and if the identification code is the first identification code, the restore instruction instructs to return to an interrupted point of said predetermined instruction, and if the identification code is not the first identification code, the restore instruction instructs to return to said address as set into said program counter for said restore processing.

6. A method for controlling interruption of a processor according to claim 2, wherein the second restore instruction instructs to return to an interrupted point of said predetermined instruction, while a first restore instruction, different from said second restore instruction, instructs to return to said address as set into said program counter for said restore processing.

7. A method for controlling interruption of a processor according to claim 2, wherein said restore processing consists only of the second restore instruction.

8. A method for controlling interruption of a processor according to claim 2, wherein interrupt processing saves said address as set into said program counter for said restore processing and a program level.

9. A method for controlling interruption of a processor according to claim 4, wherein interrupt processing saves a second identification code other than the first identification code.

10. An apparatus for controlling interruption of a processor for processing interruption in accordance with an interrupt level, comprising:

(a) means for determining the interrupt level in a course of execution of a predetermined instruction;
(b) means for saving internal information of the processor;
(c) means for setting an address of restoring processing for saving into a program counter as an instruction to be next executed, and terminating execution of said predetermined instruction;
(d) means for not carrying out restoring processing but carrying out interrupt processing in response to termination of execution of said predetermined instruction; and
(e) means for returning to an interrupted point of said predetermined instruction by restore processing executed from an address set in said program counter after termination of interrupt processing.

* * * * *